(12) United States Patent  
Binder (10) Patent No.: US 7,106,721 B1  
(45) Date of Patent: Sep. 12, 2006

(54) TELEPHONE COMMUNICATION SYSTEM OVER A SINGLE TELEPHONE LINE

(75) Inventor: Yehuda Binder, Hod HaSharon (IL)

(73) Assignee: Serconet, Ltd., Ra'anana (IL)

( * ) Notice: Subject to any disclaimer, the term of this patent is extended or adjusted under 35 U.S.C. 154(b) by 614 days.

(21) Appl. No.: 09/594,765

(22) Filed: Jun. 16, 2000

(30) Foreign Application Priority Data

Apr. 18, 2000 (IL) ..................................... 135744

(51) Int. Cl.
  *H04L 12/66* (2006.01)
  *H04J 3/16* (2006.01)
(52) U.S. Cl. .................. 370/352; 370/493; 370/466
(58) Field of Classification Search ............. 370/357, 370/360, 463, 466, 485, 488, 497, 535, 536, 370/537, 538, 542, 352, 353, 354, 355, 356, 370/419, 420, 421, 430, 350, 493, 494; 379/93.01, 379/93.07
See application file for complete search history.

(56) References Cited

U.S. PATENT DOCUMENTS

| | | | |
|---|---|---|---|
| 4,459,434 A | | 7/1984 | Benning et al. |
| 4,674,085 A | * | 6/1987 | Aranguren et al. ......... 370/408 |
| 4,766,402 A | | 8/1988 | Crane |
| 4,785,448 A | | 11/1988 | Reichert et al. |
| 4,821,319 A | | 4/1989 | Middleton et al. |
| 5,090,052 A | | 2/1992 | Nakajima et al. |
| 5,473,613 A | | 12/1995 | Bliven |
| 5,596,631 A | | 1/1997 | Chen |
| 5,610,922 A | * | 3/1997 | Balatoni ..................... 370/468 |
| 5,627,833 A | | 5/1997 | Bliven |
| 5,682,386 A | | 10/1997 | Arimilli et al. |
| 5,781,622 A | | 7/1998 | Ben-Zion |
| 5,841,360 A | | 11/1998 | Binder |
| 5,896,443 A | | 4/1999 | Dichter |
| 5,898,761 A | * | 4/1999 | McHale et al. .......... 379/93.01 |
| 6,005,873 A | * | 12/1999 | Amit .......................... 370/494 |
| 6,038,300 A | | 3/2000 | Hartmann et al. |
| 6,046,995 A | | 4/2000 | Turnbull et al. |
| 6,141,330 A | * | 10/2000 | Akers ......................... 370/264 |
| 6,151,333 A | * | 11/2000 | Arimilli et al. ............. 370/468 |
| 6,212,204 B1 | * | 4/2001 | Depue ........................ 370/485 |
| 6,240,166 B1 | * | 5/2001 | Collin et al. ............. 379/93.08 |
| 6,324,167 B1 | * | 11/2001 | Starr .......................... 370/250 |
| 6,347,075 B1 | * | 2/2002 | Barzegar et al. ............ 370/228 |
| 6,519,250 B1 | * | 2/2003 | Fan ............................. 370/352 |
| 6,539,081 B1 | * | 3/2003 | Zakrzewski et al. ..... 379/93.32 |
| 6,639,913 B1 | * | 10/2003 | Frankel et al. ............. 370/356 |
| 6,680,940 B1 | * | 1/2004 | Lewin et al. ............... 370/389 |
| 6,714,534 B1 | * | 3/2004 | Gerszberg et al. .......... 370/352 |
| 6,747,995 B1 | * | 6/2004 | Brown et al. ............... 370/493 |
| 2003/0026247 A1 | | 2/2003 | Bernstein |

FOREIGN PATENT DOCUMENTS

| | | |
|---|---|---|
| WO | WO 95/29576 A3 | 11/1995 |
| WO | 97 19533 | 5/1997 |
| WO | WO 97/19533 A1 | 5/1997 |
| WO | WO 99/12330 A1 | 3/1999 |

* cited by examiner

*Primary Examiner*—Afsar Qureshi
(74) *Attorney, Agent, or Firm*—Browdy and Neimark, PLLC (57) ABSTRACT

An improved telephone system over a single telephone line within a residence or other building is disclosed, supporting exchange features and enabling easy expansion for multiple external lines. The existing telephone wiring is used as the medium for a local data communication network, carrying multiple voice channels. In each outlet, one or more voice channels are converted into a standard telephone-line interface. Life-line functionality is facilitated by using the lower band of the spectrum isolated from the data communication network, and a dedicated connector in the outlet provides access to this band. External telephone feeders are converted to digital form for interfacing to the in-home data communication network.

8 Claims, 13 Drawing Sheets

Figure 1 (Prior-Art)

Figure 2 (Prior-Art)

Figure 3 (Prior-Art)

Figure 4 (Prior-Art)

Figure 5 (Prior-Art)

Figure 6 (Prior-Art)

TELEPHONE COMMUNICATION SYSTEM OVER A SINGLE TELEPHONE LINE

FIELD OF THE INVENTION

The present invention relates to the field of telephony communication networks, and, more specifically, to the networking of telephone sets within a building over single telephone line.

BACKGROUND OF THE INVENTION

There is a growing need for expanded telephone communication capabilities within the home. This need is driven by two major factors: the increasing use of additional outside lines and the desirability of exchange functionality within the home, such as for intercom systems.

Telephone Wiring

Figure 1:
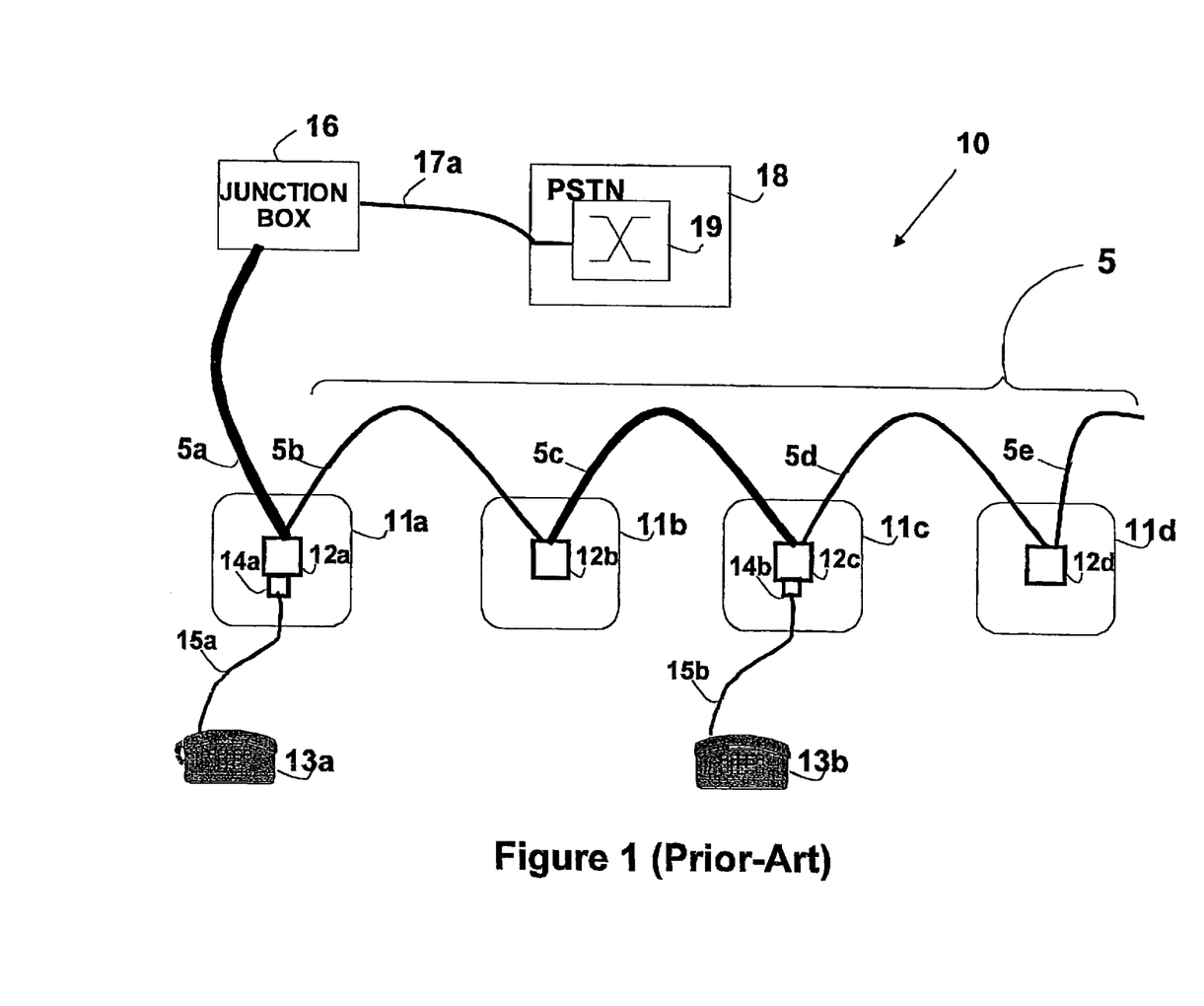
FIG. 1 shows a common prior art telephone line wiring configuration for a residence or other building.

An in-home telephone service usually employs two or four wires, and is accessed via telephone outlets into which the telephone sets are connected. FIG. 1 shows the wiring configuration of a prior-art telephone system 10 for a residence or other building, wired with a residential telephone line 5. The residential telephone line 5 consists of single wire pair which connects to a junction-box 16, which in turn connects to a Public Switched Telephone Network (PSTN) 18 via a cable 17a, terminating in a public switch 19, which establishes and enables telephony from one telephone to another. The term "analog telephony" as used herein denotes traditional analog low-frequency audio voice signals typically under 3 KHz, sometimes referred to as "POTS" ("Plain Old Telephone Service"), whereas the term "telephony" in general denotes any kind of telephone service, including digital service such as Integrated Services Digital Network (ISDN). The term "high-frequency" as used herein denotes any frequency substantially above such analog telephony audio frequencies, such as that used for data. ISDN typically uses frequencies not exceeding 100 KHz (typically the energy is concentrated around 40 KHz). The term "telephone line" as used herein denotes electrically-conducting lines which are intended primarily for the carrying and distribution of analog telephony, and includes, but is not limited to, such electrically-conducting lines which may be pre-existing within a building and which may currently provide analog telephony service. The term "telephone device" as used herein denotes, without limitation, any apparatus for telephony (including both analog telephony and ISDN), as well as any device using telephony signals, such as fax, voice-modem, and so forth.

Junction box 16 is used to separate the in-home circuitry from the PSTN and is used as a test facility for troubleshooting as well as for wiring new in the home. A plurality of telephones 13a and 13b connects to telephone line 5 via a plurality of telephone outlets 11a, 11b, 11c, and 11d. Each outlet has a connector (often referred to as a "jack"), denoted in FIG. 1 as 12a, 12b, 12c, and 12d, respectively. In North America, RJ-11 is commonly used. Each outlet may be connected to a telephone unit via a connector (often referred to as a "plug"), denoted in FIG. 1 (for the two telephone units 13a and 13b illustrated) as 14a and 14b, respectively. It is also important to note that lines 5a, 5b, 5c, 5d, and 5e are electrically different segments of the same paired conductors.

While network 10 exhibits serial or daisy-chained topology wherein the wiring is serialized from an outlet to the next one only, other topologies such as star, tree or any arbitrary topology may also be used. The telephone wiring system within a residence, however, is always composed of wired media; two or four copper wires, and outlets which provide direct access for connecting to these wires.

Additional Subscriber Lines.

Figure 2:
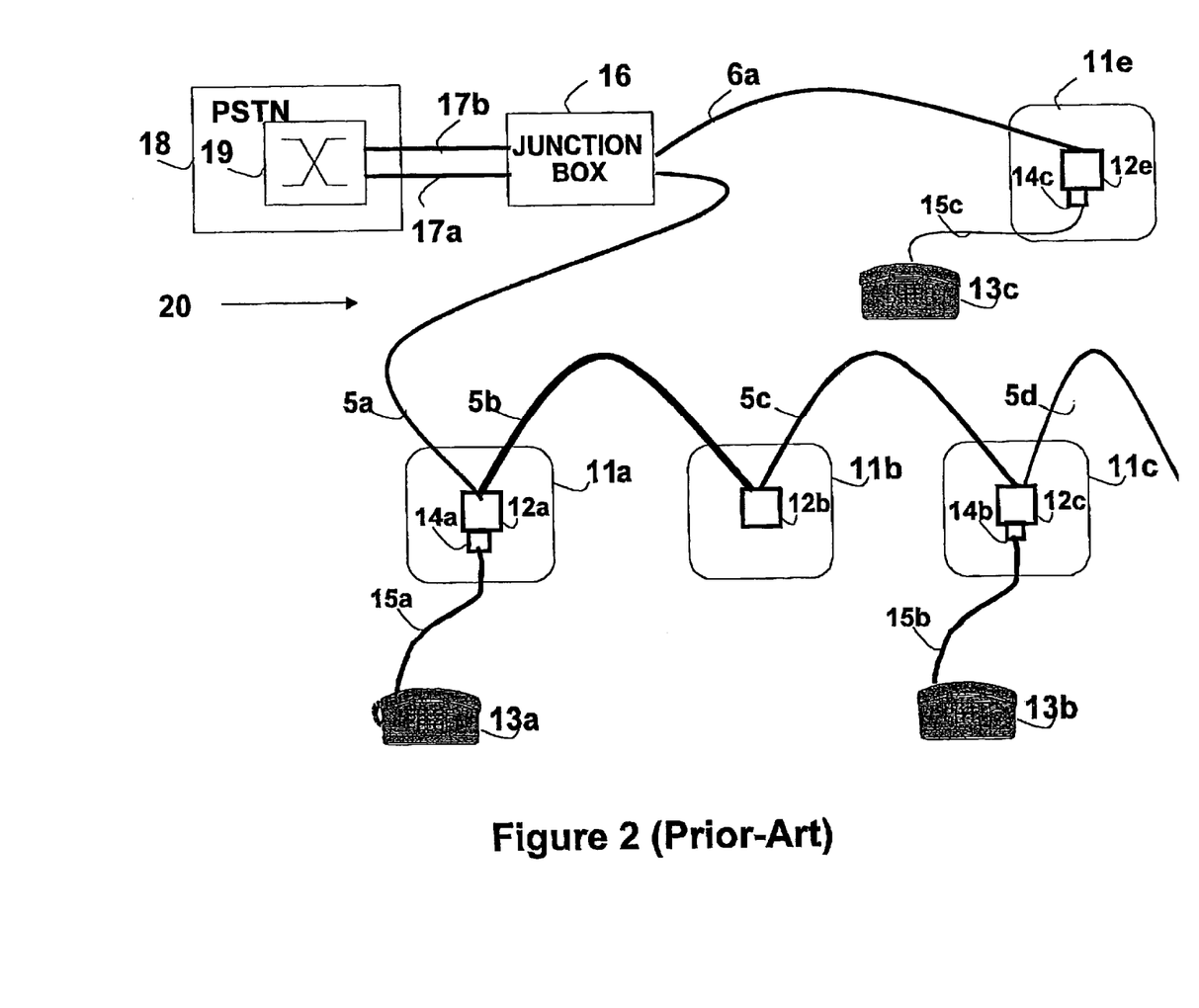
FIG. 2 shows a prior art two-line telephone wiring configuration for a residence or other building.

FIG. 2 illustrates a telephone network 20 in a home, where an additional subscriber line 17b is required to be added to existing line 17a. Additional line 17b comes from exchange 18 to home junction-box 16. In order to provide access to additional line 17b, a new outlet 11e must be installed. In addition, a new telephone line 6a must be installed, routed from junction box 16 to the outlet 11e. In such an installation, a telephone set 13c is connected using a cable 15c, via connectors 1.4c and 12e to the added subscriber line.

Alternatively, the new wiring 6a can be routed together and as part of existing wiring 5, using the same in-wall routing. In such a case, either several new telephone outlets need to be installed, or the existing outlets need to be replaced with ones employing two or more telephone connectors.

In both the cases described above, new wiring must be added. The routing and installation of such wiring is both labor-intensive and expensive. Adding the new wiring on the exterior of the wall is less expensive, but may be aesthetically undesirable.

In buildings where four wires (two pairs) have been installed, adding a second subscriber line is quick and easy. The second pair of the existing wiring is used for the second subscriber line, thus obviating the need for routing additional wires. However, the same problem of needing additional wires is encountered in this case when a third or fourth subscriber line is required. In general, additional wiring is required whenever adding a new subscriber line to a home exceeds the capacity of the existing wiring.

Figure 3:
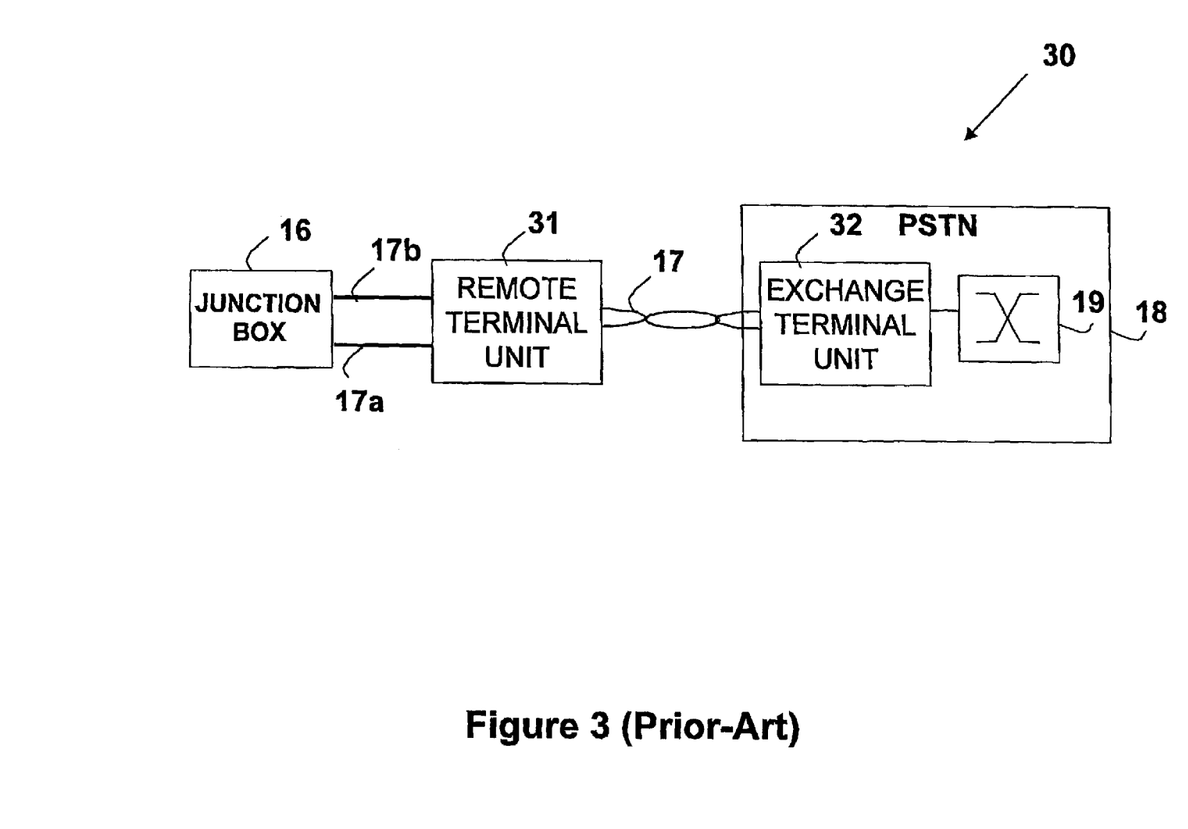
FIG. 3 shows a first prior-art telephone network for providing multiple lines to a residence or other building.

FIG. 2 illustrates the case where the added subscriber lines involve the use of dedicated wiring from the exchange to the home for each such added subscriber line. New technology, however, enables multiple voice channels to be carried over a single twisted-pair (local-loop). Specifically, Digital Subscriber Line (DSL) technologies are available. For example, ISDN-BRA (Integrated Services Digital Network—Basic Rate Access, commonly referred to as ISDN) can carry two voice channels over a single twisted pair, HDSL (High Bit rate Digital Subscriber Line) supports up to 16 voice channels, and HDSL2 supports up to 30 voice channel over a single twisted pair. These and other such technologies commonly employ two modems, connected to each end of the twisted pair, as shown in network 30 in FIG. 3. The pair 17 in the local loop interfaces in the exchange side with an exchange terminal unit 32, which communicates over the local loop pair to a remote terminal unit 31, located at the customer side of the cable. Remote terminal unit 31 in turn provides subscriber line interfaces 17a and 17b, connected to junction box 16. In an alternate configuration, the voice channels are multiplexed within a digital stream, such as PCM highway, ATM or other buses.

Figure 4:
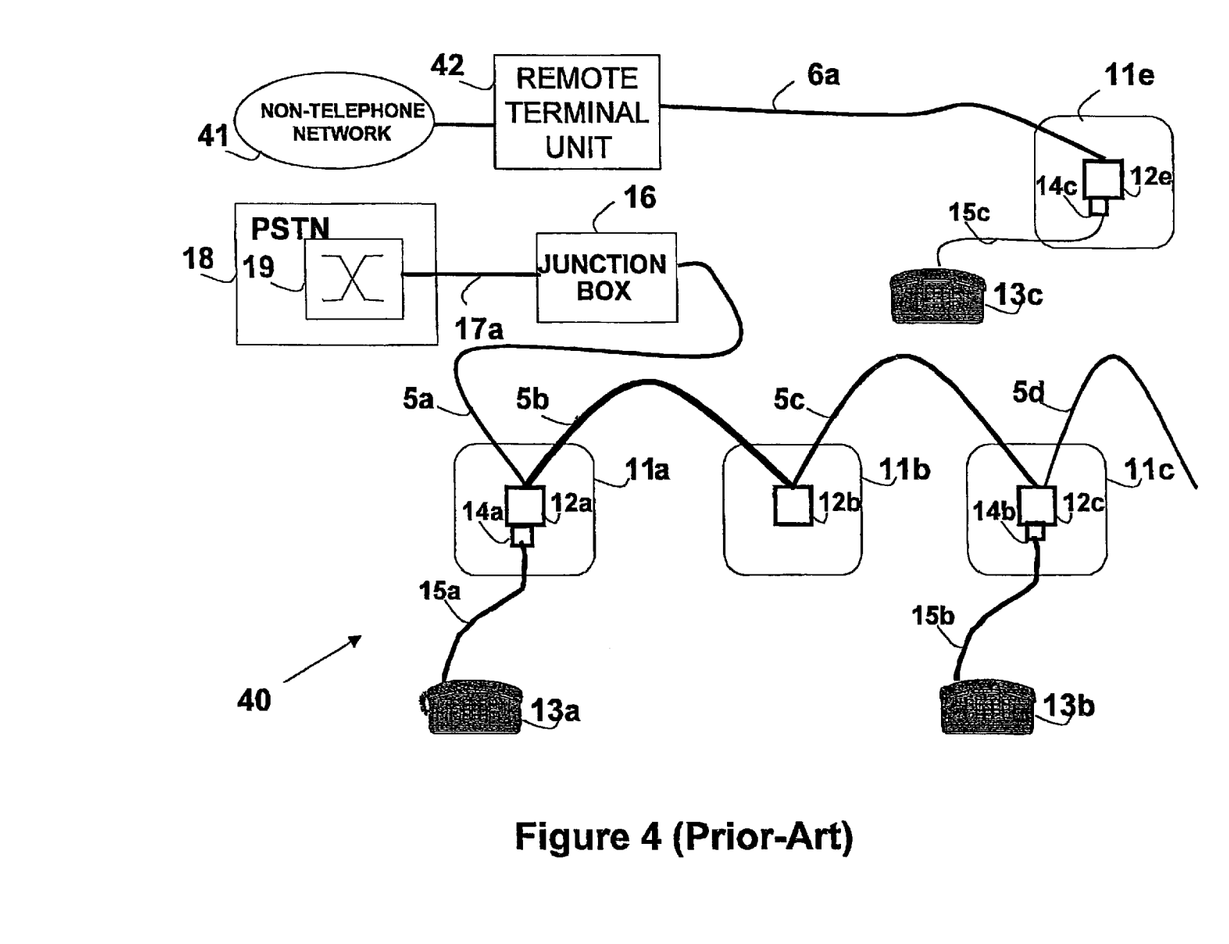
FIG. 4 shows a second prior-art telephone network for providing multiple lines to a residence or other building.

The recent move towards de-regulation has enabled the subscriber to receive telephone services from providers other than the traditions telephone companies. One example is the competitive carriers in the United-States. In addition, non-telephone businesses, such as cable television and satellite-based network providers, are starting to offer telephone services. Thus, the customer may select added subscriber lines to be supplied by different service providers. FIG. 4 illustrates a configuration for such a customer, employing a telephone network 40. A first telephone line is supplied by a traditional telephone company as shown in FIG. 1 and previously described. However, a second telephone line is provided by a non-original telephone provider, which connects to non-telephone network 41. For example, this can be a cable television network. The voice channel is provided via a remote terminal unit 42, which provides the additional telephone line 6a, and communicates with the non-telephone network 41. For example, the remote terminal unit 42 can be part of Set-Top Box or Cable Modem.

Exchange Features

As used herein, the phrase "PABX-type features", or the idiomatic equivalent thereof, is intended to encompass features including, but not limited to: hold/call pick up; call transfer between subsets; conference calls; calls coming from, or going to, a central office exchange; ringing on all subsets; repertory dialing; memory dialing. A rapid expansion in residential-oriented telephone systems and equipment has been developing to satisfy an ever growing number of needs related to telephone communication. One particular need in many residences is the ability to selectively communicate among a number of telephone sets all of which are connected via the single central office telephone line that accesses the residence. In addition, other identified needs of residential subscribers are similar to those of businesses having a private automatic branch exchange (PABX). However, most such existing exchanges require 'star' topology, in which all outlets are directly connected to the exchange. While this topology is supported in some residences, most buildings do not employ such a topology, as the example in FIG. 1 illustrates. In such a case, a private automatic branch exchange cannot easily be employed, unless effort is made to modify the wiring into 'star' topology. U.S. Pat. Nos. 4,821,319, 4,459,434, 5,090,052, 5,596,631, 5,781.622 and 6,038,300, as well as other patents classified under US Classes 379/177 and 379/363, disclose a few embodiments enabling limited exchange functionalities in a residence using single wire pair.

Data over Telephone Lines

There is a requirement for simultaneously using the existing telephone infrastructure for both telephone and data networking. In this way, the task of establishing a new local area network in a home or other building is simplified, because there would be no additional wires to install. U.S. Pat. No. 4,766,402 to Crane (hereinafter referred to as "Crane") teaches a way to form a LAN over two-wire telephone lines, but without the telephone service.

The concept of frequency domain/division multiplexing (FDM) is well-known in the art, and provides means of splitting the bandwidth carried by a wire into a low-frequency band capable of carrying an analog telephony signal and a high-frequency band capable of carrying data communication or other signals. Such a mechanism is described, for example, in U.S. Pat. No. 4,785,448 to Reichert et al (hereinafter referred to as "Reichert"). Also widely used are xDSL systems, primarily Asymmetric Digital Subscriber Loop (ADSL) systems.

As another example, relevant prior-art in this field is disclosed in U.S. Pat. No. 5,896,443 to Dichter (hereinafter referred to as "Dichter"). Dichter suggests a method and apparatus for applying frequency domain/division multiplexing (FDM) technique for residential telephone wiring, enabling simultaneously carrying telephone and data communication signals. The bandwidth enabled by the wiring is split into a low-frequency band capable of carrying an analog telephony signal and a high-frequency band capable of carrying data communication signals. In such a mechanism, the telephone service is not affected, while data communication capability is provided over existing telephone wiring within a home.

Figure 5:
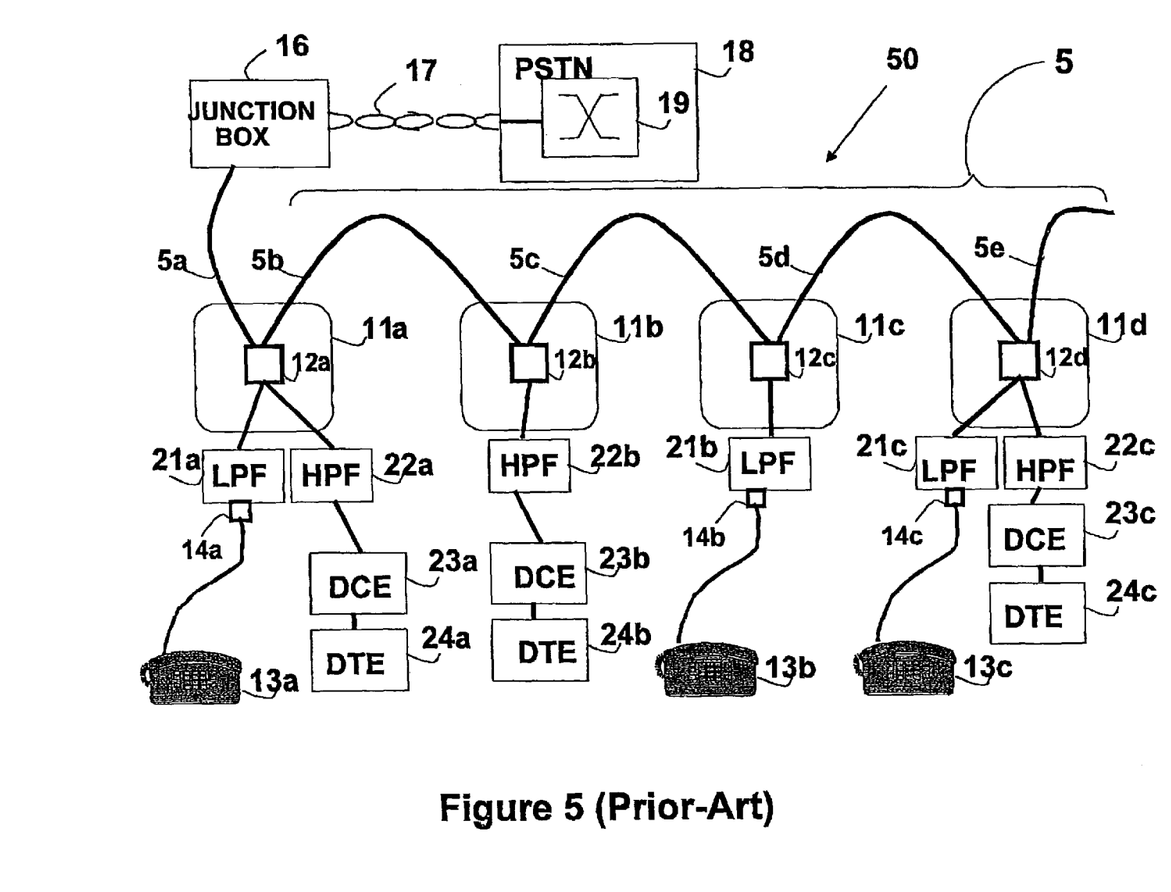
FIG. 5 shows a first prior-art local area network based on telephone line wiring for a residence or other building.

The Dichter network is illustrated in FIG. 5, which shows a network 50 serving both telephones and providing a local area network of data units. Data Terminal Equipment (DTE) units 24a, 24b, and 24c are connected to the local area network via Data Communication Equipment (DCE) units 23a, 23b, and 23c, respectively. Examples of Data Communication Equipment include modems, line drivers, line receivers, and transceivers (the term "transceiver" as used herein denotes a combined transmitter and receiver). DCE units 23a, 23b, and 23c are respectively connected to high pass filters (HPF) 22a, 22b, and 22c. The HPF's allow the DCE units access to the high-frequency band carried by telephone-line 5. In a first embodiment (not shown in FIG. 5), telephones 13a, 13b, and 13c are directly corrected to telephone line 5 via connectors 14a, 14b, and 14c, respectively. However, in order to avoid interference to the data network caused by the telephones, in a second embodiment (shown in FIG. 5) low pass filters (LPF's) 21a, 21b, and 21c are added to telephones 13a, 13b, and 13c from telephone line 5. Furthermore, a low pass filter may also be connected to Junction Box 16, in order to filter noises induced from or to the PSTN wiring 17. It is important to note that lines 5a, 5b, 5c, 5d, and 5e are electrically different segments of the same paired conductors.

Additional prior-art patents in this field can be found under US Class 379/093.08, which relates to carrying data over telephone wiring without any modifications made to the telephone wiring (e.g. wires and outlets), U.S. Pat. No. 5,841,360 and U.S. patent application Ser. Nos. 09/123,486 and 09/357,379 to the present inventor are the first to suggest modifying the telephone wiring, by means of splitting the wiring into distinct segments, each of which connects two telephone outlets. In this way, the network is modified from 'bus' topology into multiple 'point-to-point' segments, enabling superior communication characteristics.

Figure 6:
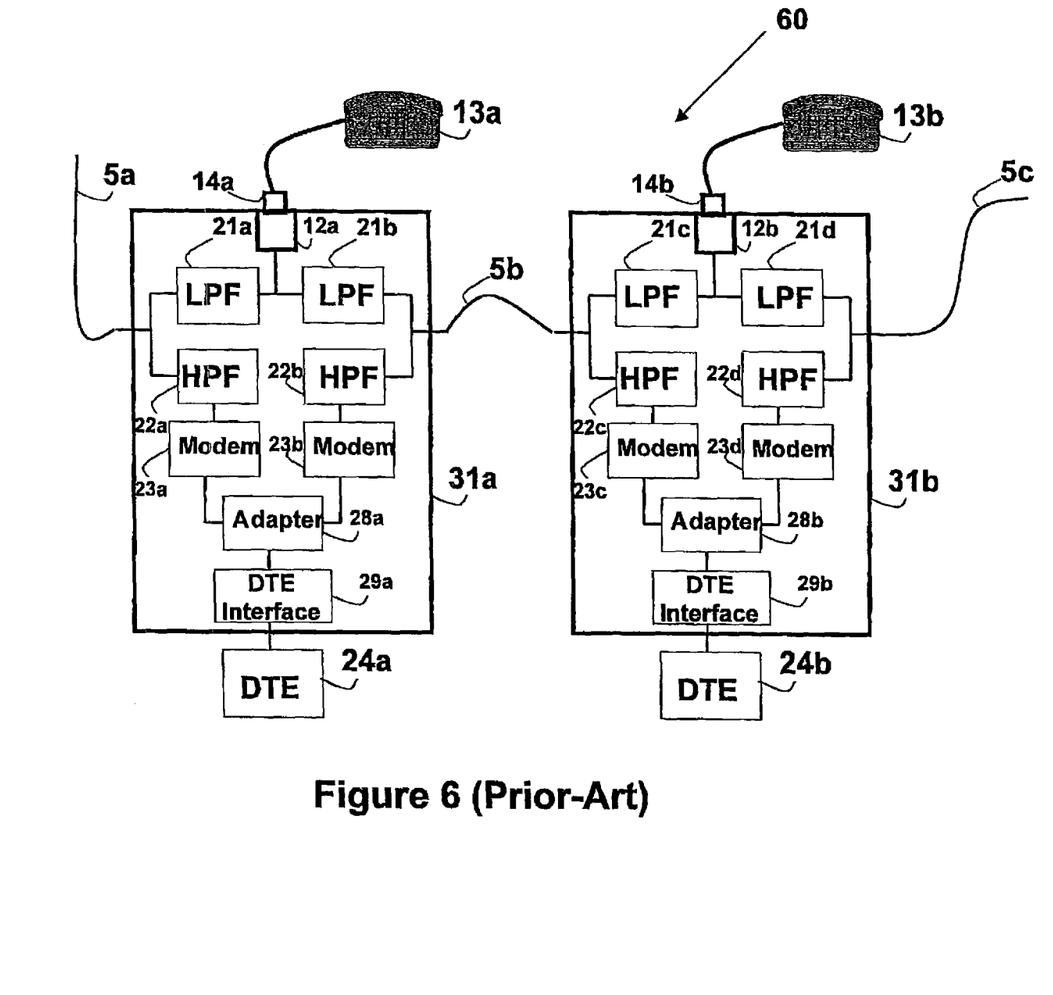
FIG. 6 shows part of a second prior-art local area network based on telephone line wiring for a residence or other building.

Part of such a network 60 is shown in FIG. 6, describing outlets 31a and 31b, substituting outlets 11 of FIG. 1. The telephone wiring 5 is split into distinct segments 5a, 5b, and 5c. Low-Pass Filters (LPF) and High-Pass Filters (HPF) are coupled to each wire segment end, in order to split between the telephony and the data signals. As shown in FIG. 6, LPF's 21b and 21c are respectively attached to opposite ends of the wiring segment 5b. The LPF's are designed to allow passing of the telephony signals, and are connected together thus offering a continuous path for the telephony signals. Access to the telephony signals is made via connectors 2a and 12b in the outlets, into which telephone devices 13a and 13b are connected via connectors 14a and 14b respectively. Thus, the telephony service is fully retained. The data signals, carried in the high part of the spectrum, are accessed via HPF's 22b and 22c, also coupled respectively to opposite ends of the telephone wire segment 5b. HPF's 22a and 22d are connected to the ends of the wire segments 5a and 5c respectively. Each HPF is connected to a modem 23, which transmits and receives data signals over the telephone wiring. Modems 23a, 23b, 23c, and 23d are connected to HPF's 22a, 22b, 22c and 22d respectively. Data units 24a and 24b are connected to the outlets 31a and 31b respectively, via a respective connector (not shown in the Figure) in each outlet. The data units are coupled via a respective DTE interface in the outlet. Outlets 31a and 31b comprise DTE interfaces 29a and 29b respectively. The three data streams in each outlet, two from each modem and one from the DTE, are handled by an adapter 28*a* and an adapter 28*b*, which serve outlets 31*a* and 31*b*, respectively. While FIG. 6 describes an embodiment wherein all the components for the relevant functions are housed within the outlet, other embodiments are also possible, wherein only some of the components for these functions are contained within the outlet.

Life-Line

The term "life-line" as used herein denotes the basic use of the telephone service for emergency purposes. As such, it is required that a malfunction of any other system or service (e.g. electricity) will not degrade the telephone system capability. In practical terms, this means that as long as an operational telephone set is connected to the exchange via continuous two wires, the telephone service will be maintained, even in the case of power outage.

There is thus a widely recognized need for, and it would be highly advantageous to have, a means for implementing a telephone system in-home, wherein the telephone units can be networked within the home as well as to multiple external subscriber lines, without requiring the installation of additional wires within the home. This goal is met by the present invention.

SUMMARY OF THE INVENTION

The present invention discloses an improved telephone system within a building over a single telephone line. The telephone line within the building is used as a medium for a communication network carrying multiple voice channels in a TDM (Time Domain multiplexing) fashion. New wiring or a pre-existing telephone lines may be used. In each outlet, conversion between one or more of the data voice channels to and from a standard analog telephone signal (POTS) is performed by a module. The exchange features previously described are implemented by digitally routing the voice channels between the outlets. Signals from external telephone feeders (connections between the telephone service provider's central office and the line within the building) can also be digitized by a module and routed within the communication network. In this way, standard analog telephone equipment and signals therefrom can be interfaced by the modules and used in a multiple voice channel network over a single telephone line.

Two types of communication network are supported. In the first configuration, the telephone wiring is retained in the typical continuous arrangement, thereby forming a bus-type network, where the module within each outlet has a single telephone-line modem. In the second configuration, the telephone lines are broken at each outlet, and a telephone-line modem is coupled to each wire end, thereby forming point-to-point communication segments between each pair of connected outlets.

The module that couples the telephone line to the telephone interface, or any of the components of the module, can be fully integrated into the outlet, partially integrated into the outlet, or externally configured.

Life-line functionality is facilitated by using passive filters to separate the available line bandwidth into a low band and a high band. The high band is used by the multiple voice channel communication network, while the low band is used for carrying a standard analog telephone service without using any active components. In such a case, each outlet may contain a life-line telephone interface and one or more telephone interfaces for the voice channels carried by the communication network.

Therefore, the present invention provides for use with a telephone installation within a building, the telephone installation having a line and external connections between the line and a central office of a telephone service provider, a system for connecting to the telephone installation so as to allow more voice channels to be carried over the line without requiring modification or extension of the telephone installation, the system comprising at least two modules for coupling to the telephone line, wherein said modules are operative for:
  (i) converting between at least one standard analog telephone signal and at least one time-domain multiplexed voice channel; and
  (ii) interfacing with standard analog telephone equipment and signals therefrom.

Furthermore, according to the present invention there is provided a kit for upgrading a pre-existing telephone installation having a line within a building so as to allow more voice channels to be carried over the line without requiring modification or extension of the telephone installation, the kit including:
  (i) at least one outlet, said outlet having a connection for coupling to the line; and
  (ii) a module operative for:
    a) converting between at least one standard analog telephone signal and at least one time-domain multiplexed voice channel; and
    b) interfacing with standard analog telephone equipment and signals therefrom.

Moreover, according to the present invention there is provided a method for upgrading a pre-existing telephone installation having a line within a building, so as to allow more voice channels to be carried over the line without requiring modification or extension of the telephone installation, the method including the steps of:
  (i) providing a telephone line modem;
  (ii) providing a subscriber-line interface;
  (iii) providing a drop-and-insert multiplexer for interfacing between the voice channels and said subscriber-line interface;
  (iv) providing an outlet; and
  (v) equipping said outlet with said telephone-line modem, said subscriber-line interface, and said drop-and-insert multiplexer.

BRIEF DESCRIPTION OF THE DRAWINGS

The invention is herein described, by way of example only, with reference to the accompanying drawings, wherein.

DESCRIPTION OF THE PREFERRED EMBODIMENTS

The principles and operation of a network according to the present invention may be understood with reference to the drawings and the accompanying description. The drawings and descriptions are conceptual only. In actual practice, a single component can implement one or more functions; alternatively, each function can be implemented by a plurality of components and circuits. In the drawings and descriptions, identical reference numerals indicate those components which are common to different embodiments or configurations.

Figure 7:
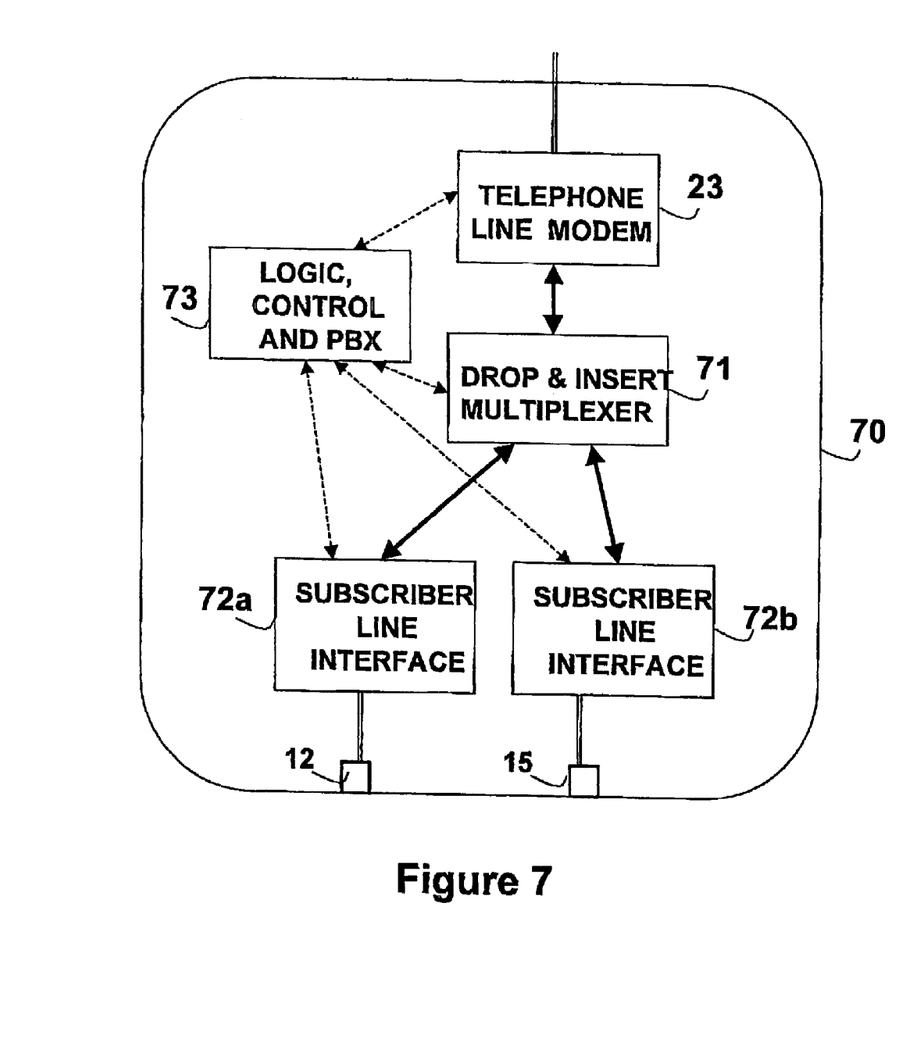
FIG. 7 shows a module according to a first embodiment of the present invention.

A first embodiment of the present invention is based on an adapter module (hereinafter denoted as a "module"), which enables the connection of a standard telephone set to the data communication network over the telephone line. FIG. 7 illustrates the functionality of a module 70. Module 70 has two ports: one for connecting to the telephone line and the other for connecting to one or more telephone sets. The module interfaces the data communication network over the telephone line by a telephone line modem 23, which can use DCE 23a as in Dichter network 50 (FIG. 5). The data communication network carries multiple digitized (e.g. PCM) voice channels. A drop-and-insert multiplexer 71 installs and extracts voice channels to and from the digital data stream in the data communication network. The voice channels to be handled by module 70 are managed by a logic, control and PBX unit 73. Each voice channel is converted into single telephone (POTS) interface via a subscriber line interface 72a, which converts the digital voice channel stream into an analog interface, capable of connecting to a standard telephone set via a connector 12. In order to facilitate a second telephone to be connected to the module 70, an additional subscriber line interface 72b is added, and couples to multiplexer 71 and to the logic, control and PBX unit 73. Subscriber line interface 72b handles an additional distinct voice channel. An additional telephone set can connect to subscriber line interface 72b via a connector 15. While the module 70 is described as having two-line support via connectors 12 and 15, to subscriber line interfaces 72a and 72b respectively, the same arrangement also applies to a single-line interface, from which subscriber line interface 72b and connector 15 are omitted. It is also clear that module 70 can support more than two such interfaces, where each such additional interface requires an additional subscriber line and connector, as well as a respective support by drop-and-insert multiplexer 71.

Module 70 may also contain additional logic, control, processing, data storage, and a power-supply. Except for facilities such as logic, control, and PBX capabilities, which are handled by unit 73, such additional functions are performed by other components not shown in FIG. 7.

Figure 8:
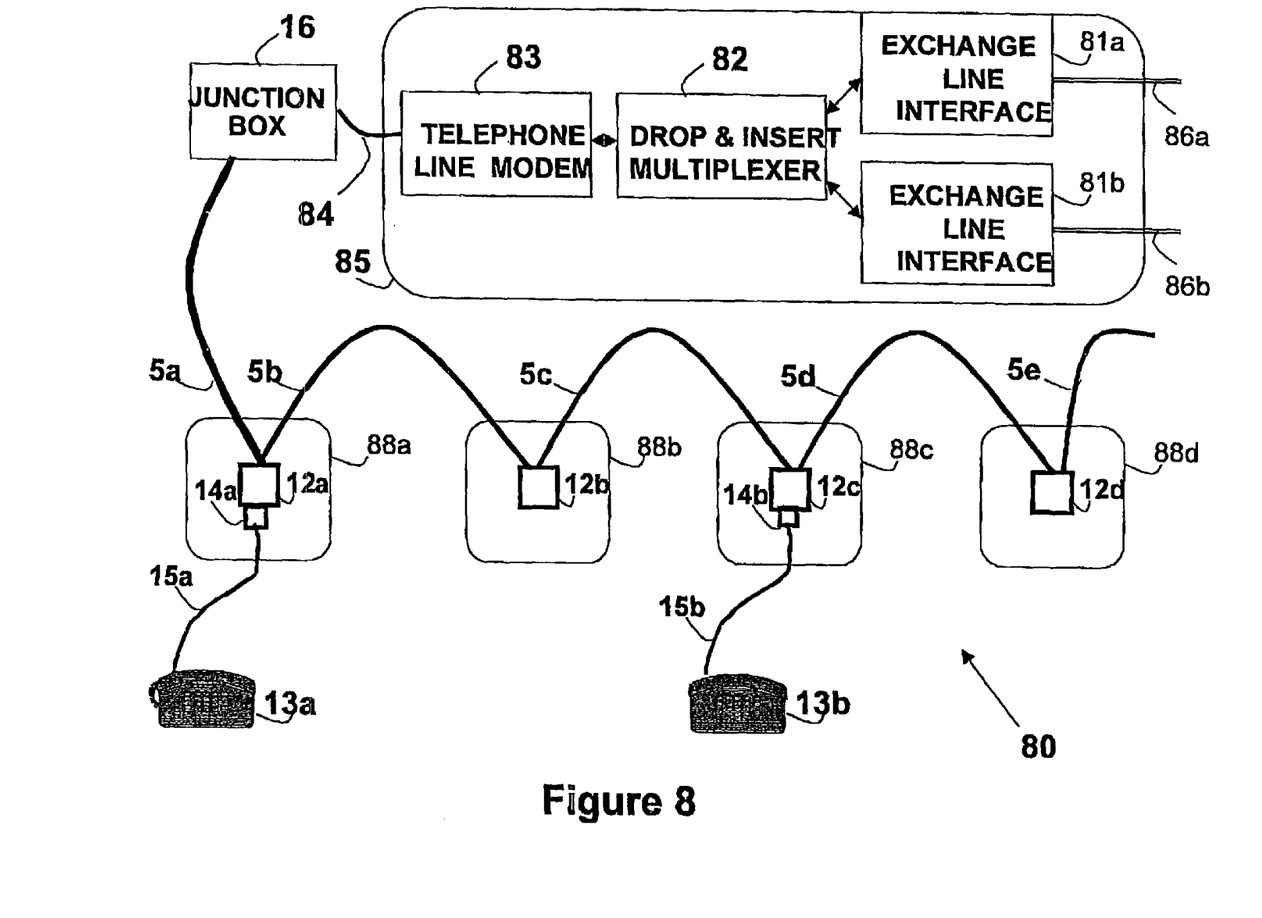
FIG. 8 shows a telephone network according to the first embodiment of present invention.

A first embodiment of a network of the present invention is based on the Dichter network. FIG. 8 illustrates a network 80, and is based upon modules, such as module 70 (FIG. 7), where each module allows a single telephone set to interface via connector 12. Each such module 70 is fully housed and integrated within a telephone outlet, such as outlets 88a, 88b, 88c, and 88d, where telephone line modem 23 connects to the telephone line port of the outlet, and the telephone connector connects to the telephone set.

As shown in FIG. 8, a data communication network is formed such that the telephone line modem (as telephone line modem 23) within each outlet (such as outlets 88a, 88b, 88c, and 88d) allows networking between and among the outlets, using telephone line 5a, 5b, 5c, 5d, and 5e as the network media. Thus, telephones 13a and 13b can communicate between themselves (e.g. for use as an intercom) over the data communication network. In order to facilitate connection to external telephone networks, a module 85 must be added. Module 85 bridges the external telephone lines to the in-home data communication network over the telephone line. Network 80 interfaces to two external telephone lines via wire pairs 86a and 86b, which can be part of a PSTN network as shown in FIG. 2, or from other outside sources as previously described. External lines 86a and 86b are converted to digital streams by exchange line interfaces 81a and 81b respectively. The voice channels are coupled to a drop-and-insert multiplexer 82, which inserts into or extracts from the digital multiplexed data stream. The multiplexed data stream is coupled to a telephone line modem 83, which communicates via a cable 84 with the in-home data network.

While network 80 has been described having two external feeders 86a and 86b, it is clear that a single such feeder can also be used. For example, if only line 86a is used, exchange line interface 81b is unnecessary. Alternatively, more than two such external feeders can be used. For each additional feeder, an additional exchange line interface must be furnished, along with additional support capability of the drop-and-insert multiplexer 82.

Implementing the network 80 within a residence requires replacing telephone outlets, such as outlet 11a (FIG. 1) by outlets according to the present invention, such as outlet 88a (FIG. 8), each containing a module, such as module 70 (FIG. 7). In this case, the line segments 5a, 5b, 5c, 5d and 5e each correspond to the single twisted pair shown in FIG. 7 connected to the telephone line modem, and the outlets 88a, 88b, 88c and 88d are connected to the line segments using a bus topology. In addition, a module such as module 85 must also be installed near the junction box 16. However, no new lines within the building need be installed or routed. After installing the network 80 within a residence, both the exchange features and the capability to interface two or more external telephone lines are available.

Figure 9:
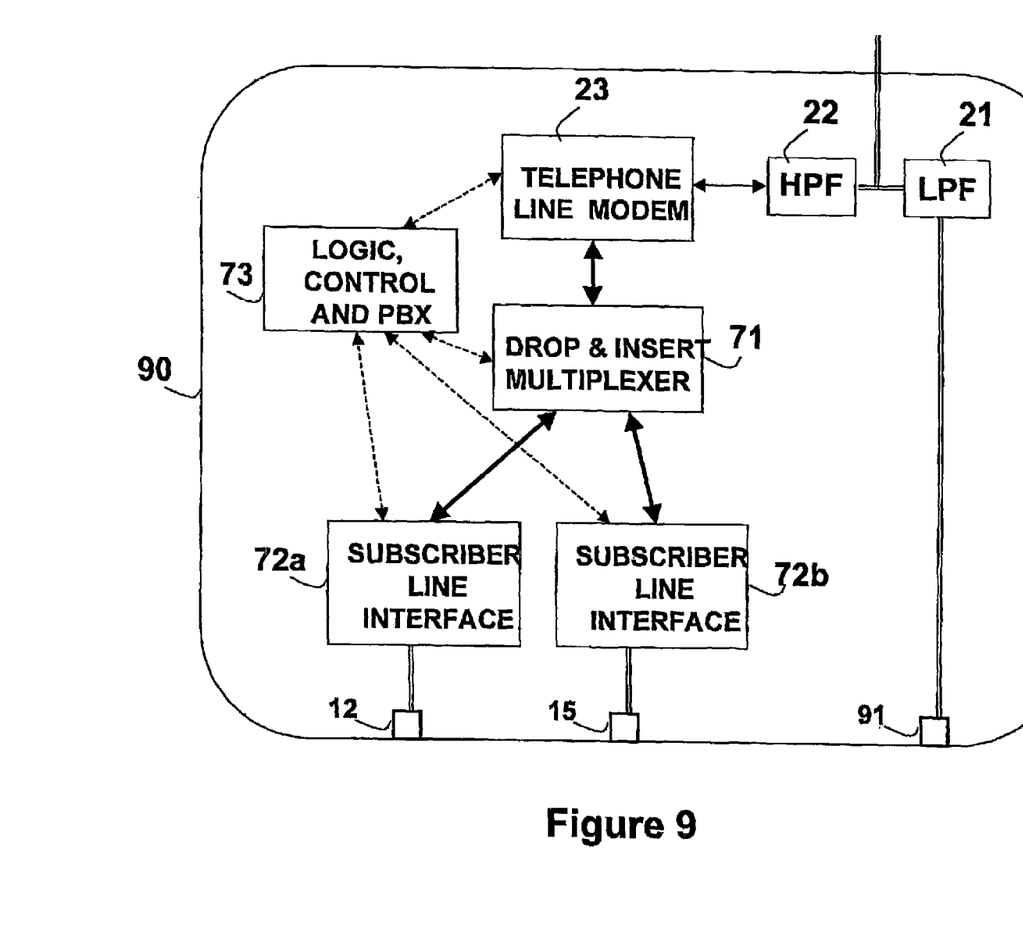
FIG. 9 shows a module according to the first embodiment of the present invention, which supports life-line capability.

Both module 70 and module 85 contain active components. Thus, in the event of a power loss or malfunction in any of the components, the network 80 may fail to provide telephony service. In order to support 'life-line' capability, therefore, the module requires additional components, FIG. 9 illustrates a modified module 90 that provides life-line capability. A High-Pass Filter (HPF) 22 and a Low-Pass Filter (LPF) 21 split the telephone spectrum into a low band for carrying standard analog signals, and into a high band for the data communication network, as described by Dichter. LPF 21 uses only passive components, and is directly coupled to a connector 91. Hence, a telephone set plunged into the connector 91 can provide 'life-line' functionality, without any active components involved in the signal path. Module 90 may feature only the life-line connector 91, or may have the life-line connector 91 in addition to the connectors 12 and 15. Alternatively, in other embodiments of the present invention, modules may not employ 'life-line' connection 91 at all.

Figure 10:
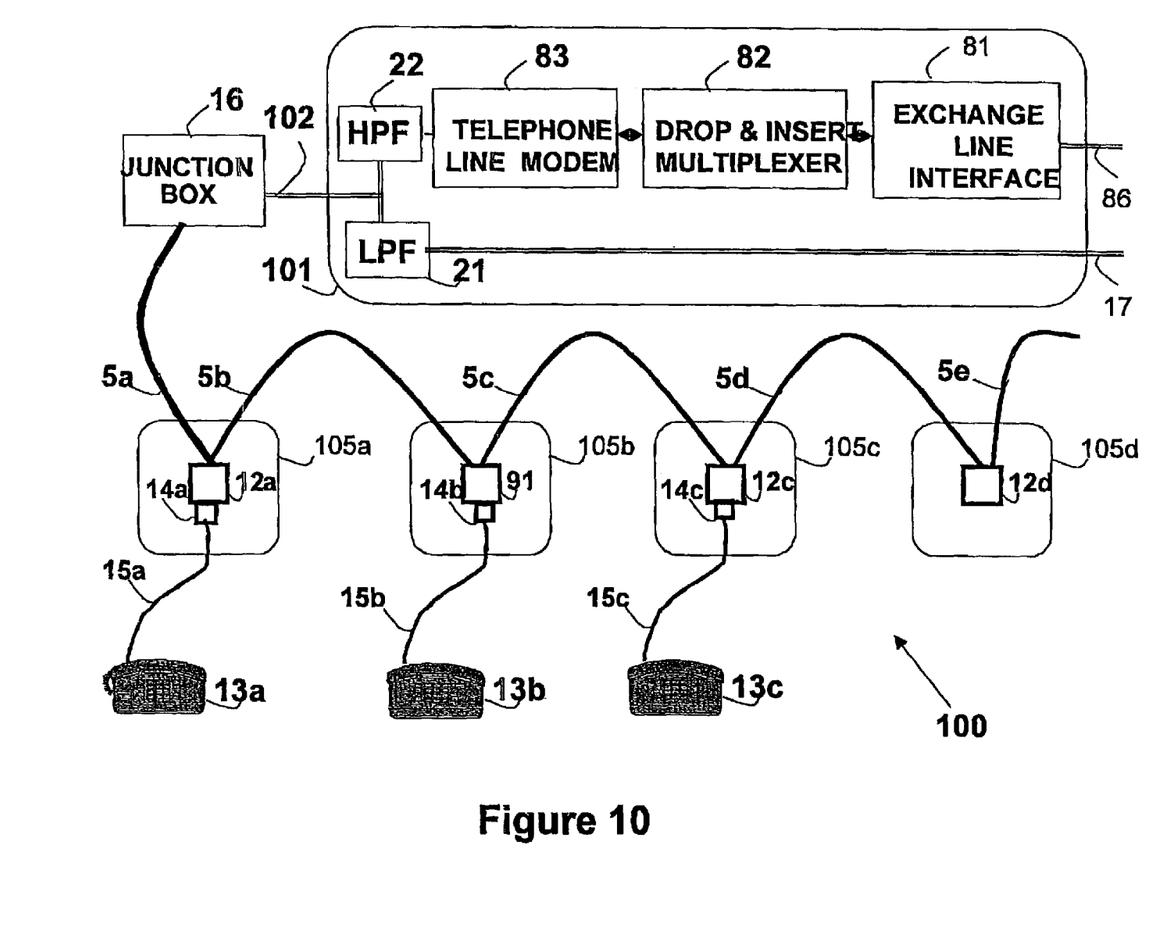
FIG. 10 shows a telephone network according to the first embodiment of present invention, which also support life-line capability.

FIG. 10 illustrates a network 100 according to the first embodiment of the invention, and features a modified network supporting life-line functionality. Network 100 includes modules 90a, 90b, 90c, and 90d, integrated within outlets 105a, 105b, 105c, and 105d respectively. Here, too, the line segments 5a, 5b, 5c, 5d and 5e each correspond to the single twisted pair shown in FIG. 9 connected to the junction of the low pass filter 21 and the high pass filter 22, and the outlets 105a, 105b, 105c and 105d are connected to the line segments using a bus topology. Outlets 105a, 105c, and 105d have connectors 12a, 12c and 12d respectively, which support telephony interfaces based on voice signals carried by the data communication network. However, outlet 105b also has a connector 91, which provides the life-line connection as shown in FIG. 9. The low band of the spectrum carries POTS signals from telephone line 17, connected to the in-home network via LPF 21. Hence, telephone set 13b is directly connected to line 17, thereby offering life-line service. The high band of the spectrum is used for the data communication network, and connects externally via HPF 22. Both LPF 21 and HPF 22 are connected by a cable 102 to junction box 16. All components serving the external line interface are included in module 101. In another embodiment of the present invention, each outlet (such as outlets 105a, 105b, 105c, and 105d) provides both life-line interface 91 in addition to at least one telephone interface 12, such that life-line access is available in all outlets within the residence.

While FIG. 10 illustrates the case where the module 90 is fully integrated within the outlet 105, embodiments of the present invention also include those where the module is external to the outlet. Likewise, selected components of a module may be integrated within the outlet while other components remain external. In all cases, of course, the appropriate electrical and mechanical connection between the module and the outlet are required.

An outlet according to the invention is physically similar in size, shape, and overall appearance to a standard outlet, so that such an outlet can be substituted for a standard outlet in the building wall. No changes are required in the overall telephone line layout or configuration.

Figure 11:
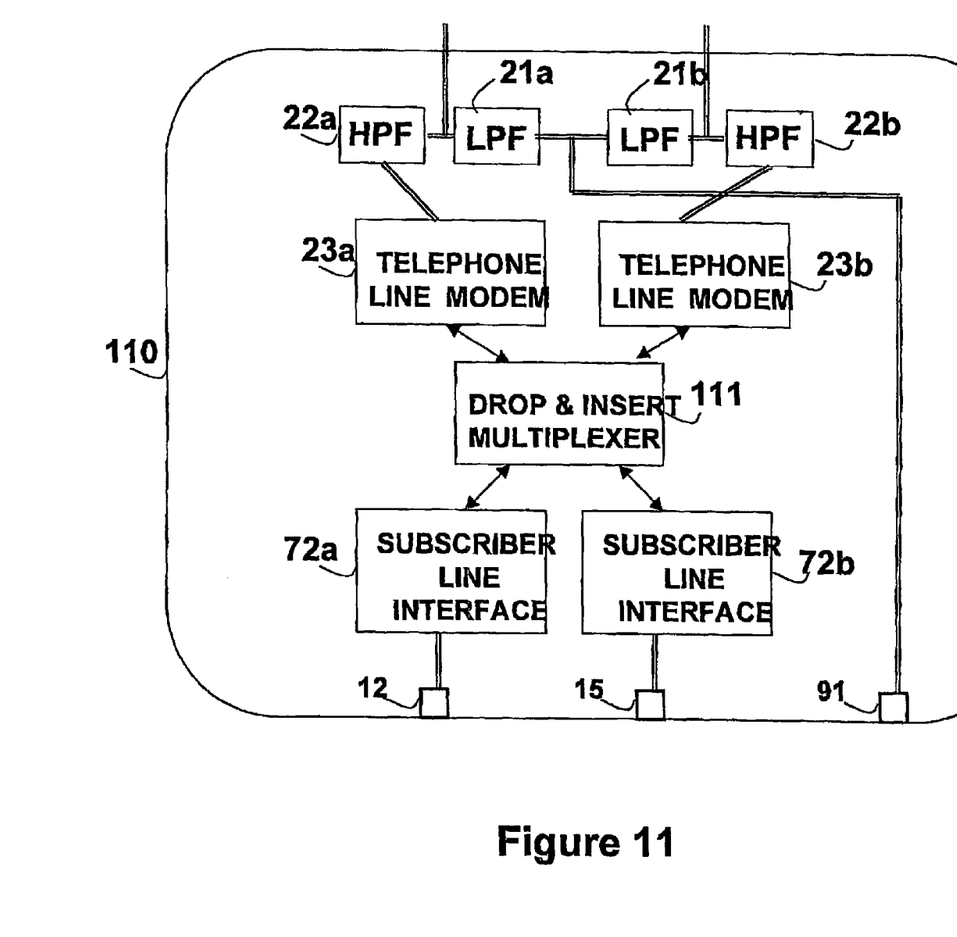
FIG. 11 shows a module according to a second embodiment of the present invention, which supports life-line capability.

While the invention has been so far described wherein the data communication network is based on the Dichter topology, the present invention can equally-well be applied to the prior-art wired network topology illustrated in FIG. 6, which is based on point-to-point data communication between any pair of connected outlets. FIG. 11 illustrates a module 110 supporting such a network, along with the life-line feature. The general configuration is similar to the module 90 described in FIG. 9. However, the connection to each telephone line segment of the point-to-point configuration has a high-pass filter (such as an HPF 22a and an HPF 22b), a low-pass filter (such as an LPF 21a and an LPF 21b), and a dedicated telephone line modem (such as modem 23a and modem 23b). A drop-and-insert multiplexer 111 inserts the voice channels into, and extracts the voice channels from, both data streams handled by telephone line modems 23a and 23b. However, voice channels not used by the module should be routed to other modules. In the case where three line segments are connected, an additional such set is required. The two LPF's 21a and 21b provide direct access to the lower band of the spectrum, and are jointly connected to life-line connector 91. If life-line support is not required, filters 21a, 21b, 22a, and 22b, as well as connector 91 can be omitted. Logic, control, PBX and other components such as power supply are not shown in FIG. 11. Additional capabilities may be provided by such components to manage such tasks as data handling and protocol conversions.

Figure 12:
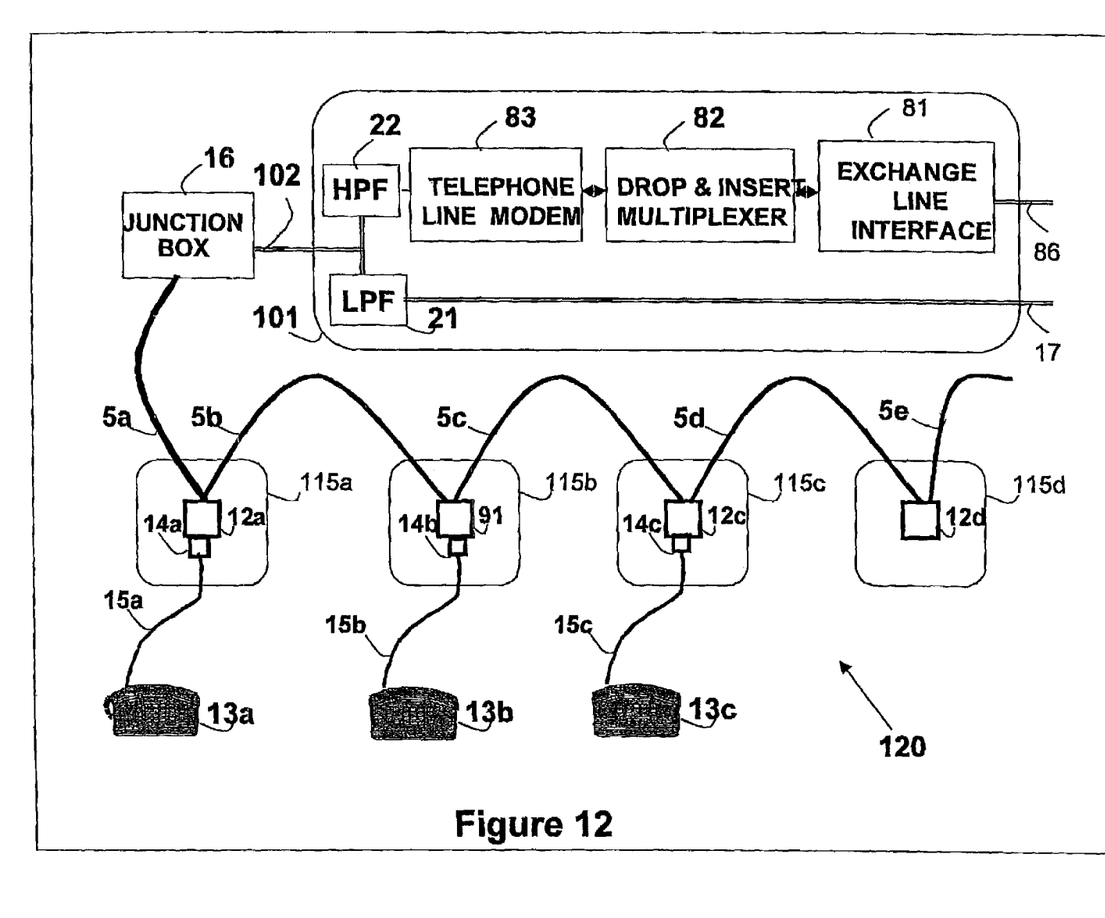
FIG. 12 shows a telephone network according to the second embodiment of present invention, which also supports life-line capability.

FIG. 12 illustrates a network 120 utilizing the modules 110. Each outlet, such as outlet 115a, 115b, 115c, and 115d, contains a module such as module 110 (FIG. 11). In this case, however, the line segment 5a corresponds to the twisted pair shown in FIG. 11 connected to the junction of the low pass filter 21a and the high pass filter 22a, whilst the line segment 5b corresponds to the twisted pair shown in FIG. 11 connected to the junction of the low pass filter 21b and the high pass filter 22b. In like manner, the line segments (5b, 5c), (5c, 5d), and (5d, 5e) each connected to the outlets 115b, 115c and 115d correspond to a respective twisted pair connected respectively to the junction of the low pass filter 21a and the high pass filter 22a and to the junction of the low pass filter 21b and the high pass filter 22b in FIG. 11. In general, the network structure of network 100 (FIG. 10) is retained. However, in this configuration, the outlets 115a, 115b, 115c and 115d are connected to the line segments using a point-to-point (or daisy chain) topology.

Upgrade Kit

Figure 13:
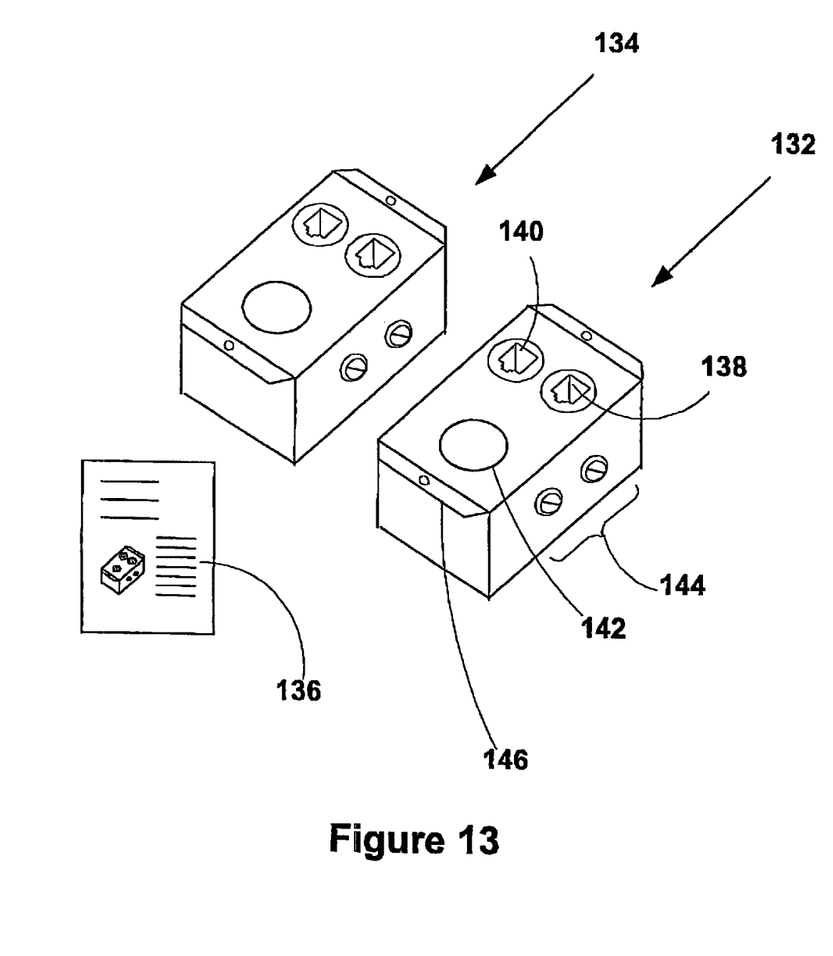
FIG. 13 shows a kit for upgrading an existing telephone installation to support a system according to the present invention.

The present invention also provides for a kit for upgrading an existing telephone installation to support a network as described herein. FIG. 13 illustrates an embodiment of such a kit containing an outlet 132 and an outlet 134 and installation instructions 136. Outlet 132 has a connection 144 for coupling to a telephone line and mounting points such as a flange 146 for installing in the building walls. Outlet 132 also has a jack 138 and a jack 140. The first supports life-line telephone service via connector 91 (FIG. 9) while the latter provides telephone service with improved exchange features. Within outlet 132 is a module according to the present invention, as previously described and illustrated in FIG. 9 or FIG. 11. Likewise, in an embodiment of the present invention, jack 138 is a telephone jack. In another embodiment, jack 140 is a data jack. The embodiment of the kit illustrated in FIG. 13 has two outlets, outlet 132 and outlet 134, which are illustrated as substantially identical. However, in another embodiment, the kit contains only outlet 132. Other variations are also possible in different embodiments. As with the modules described previously, additional components and capabilities may be provided to manage such tasks as data handling and protocol conversions.

The present invention, also provides a method for upgrading a pre-existing telephone installation having a line within a building, to support a network as described herein. The method involves:

(i) providing a telephone line modem;

(ii) providing a subscriber-line interface;

(iii) providing a drop-and-insert multiplexer for interfacing between the voice channels and said subscriber-line interface;

(iv) providing an outlet; and (v) equipping said outlet with said telephone-line modem, said subscriber-line interface, and said drop-and-insert multiplexer.

In another embodiment of the present invention, the existing installation can be upgraded to support life-line communication. In such a case, there are the additional steps of:

(vi) providing passive high-pass and low-pass filters for separating a lower band for standard analog telephone service from a higher band for multiplexed voice channels;

(vii) connecting the filters to isolate the standard analog telephone service from the multiplexed voice channels; and (viii) providing a connector to connect a standard telephone set to the standard analog telephone service.

While the invention has been described with respect to a limited number of embodiments, it will be appreciated that many variations, modifications and other applications of the invention may be made.

Thus, for example, whilst the invention has been described with particular reference to a network installed in a domestic residence, it will be apparent that no such limitation is intended and the invention is equally well applicable for use in non-domestic premises such as office, factories and the like.

The invention claimed is:

1. For use with first and second wiring segments, each segment having at least two conductors and each segment carrying a signal composed of a plurality of time-domain multiplexed digitized voice channels, at least the first wiring segment being local area network wiring in a building, a module for coupling a telephone device to said wiring segments, the module comprising:

first and second modems each couplable to a respective one of said first and second wiring segments, said first modem being operative to communicate with at least one interchangeable modem in the building over the first wiring segment and said second modem being couplable to the second wiring segment to couple to the signal carried over the second wiring segment;

selective means coupled to said first and second modems and operative to select one voice channel;

a subscriber line interface coupled to said selective means and operative to convert said one voice channel to a first analog telephone signal; and a first telephone connector coupled to said subscriber line interface and operative to couple the telephone device to said first analog telephone signal.

2. The module according to claim 1, wherein said the second wiring segment is a telephone wiring.

3. The module according to claim 1, wherein the module is dimensioned to be mountable in an outlet cavity in a wall.

4. The module according to claim 1, wherein the module is at least in part housed within an outlet.

5. The module according to claim 1, wherein at least one of said wiring segments concurrently carries a frequency domain multiplexed second analog telephone signal in a telephone band, and the module further comprises:

a frequency selective means couplable to the wiring and operative to isolate said second analog telephone signal; and a second telephone connector coupled to said frequency selective means and operative to couple a telephone device to said second analog telephone signal.

6. The module according to claim 1, wherein the multiplexed digitized voice channels carry Pulse Code Modulation (PCM) signals.

7. The module according to claim 1, wherein at least one of said wiring segments further carries data signals, and the module further comprises a data connector operative to couple a data unit to the data signals.

8. The module according to claim 1, wherein said selective means are operative to pass at least one voice channel between said first and second modems.

* * * * *